US009460220B1

(12) United States Patent
Jenkins et al.

(10) Patent No.: US 9,460,220 B1
(45) Date of Patent: Oct. 4, 2016

(54) CONTENT SELECTION BASED ON TARGET DEVICE CHARACTERISTICS

(75) Inventors: Jonathan A. Jenkins, Seattle, WA (US); Peter F. Hill, Seattle, WA (US); Brett R. Taylor, Bainbridge Island, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 1207 days.

(21) Appl. No.: 13/430,514

(22) Filed: Mar. 26, 2012

(51) Int. Cl.
*G06F 17/30* (2006.01)
*G06F 3/048* (2013.01)

(52) U.S. Cl.
CPC ... *G06F 17/30876* (2013.01); *G06F 17/30702* (2013.01)

(58) Field of Classification Search
CPC .................. G06F 17/30876; G06F 17/308884; G06F 17/30702
See application file for complete search history.

(56) References Cited

U.S. PATENT DOCUMENTS

| | | | |
|---|---|---|---|
| 5,634,064 | A | 5/1997 | Warnock et al. |
| 5,872,850 | A | 2/1999 | Klein et al. |
| 5,961,593 | A | 10/1999 | Gabber et al. |
| 6,049,812 | A | 4/2000 | Bertram et al. |
| 6,108,637 | A | 8/2000 | Blumenau |
| 6,138,156 | A | 10/2000 | Fletcher et al. |
| 6,195,679 | B1 | 2/2001 | Bauersfeld et al. |
| 6,430,624 | B1 | 8/2002 | Jamtgaard et al. |
| 6,549,941 | B1 | 4/2003 | Jaquith et al. |
| 6,560,620 | B1 | 5/2003 | Ching |
| 6,625,624 | B1 | 9/2003 | Chen et al. |
| 6,704,024 | B2 | 3/2004 | Robotham et al. |
| 6,785,864 | B1 | 8/2004 | Te et al. |
| 6,871,236 | B2 | 3/2005 | Fishman et al. |
| 6,944,665 | B2 | 9/2005 | Brown et al. |
| 6,963,850 | B1 | 11/2005 | Bezos et al. |
| 7,003,442 | B1 | 2/2006 | Tsuda |
| 7,051,084 | B1 | 5/2006 | Hayton et al. |
| 7,054,952 | B1 | 5/2006 | Schwerdtfeger et al. |

(Continued)

FOREIGN PATENT DOCUMENTS

WO    WO 2013/003631 A2    1/2013

OTHER PUBLICATIONS

Rao, H.C.-H.,et al., "A Proxy-Based Personal Web Archiving Service," Operating Systems Review, 35(1):61-72, 2001.

(Continued)

*Primary Examiner* — Dustin Nguyen
*Assistant Examiner* — Juan C Turriate Gastulo
(74) *Attorney, Agent, or Firm* — Knobbe Martens Olson & Bear LLP

(57) ABSTRACT

Various features are described for providing or recommending network-accessible content to users based partly on characteristics of user computing devices. The features are particularly useful for recommending network resources such as content pages to users, where the recommended network resources are determined to be popular or otherwise of interest to the users, and where the recommended network resources provide a satisfactory user experience on devices which share one or more characteristics with the user computing devices. Device characteristic data reported by the user computing devices can be used to make such assessments. Additional features include obtaining and transmitting versions of requested content that are determined to provide a satisfactory user experience on devices which share one or more characteristics with the user computing devices.

22 Claims, 7 Drawing Sheets

(56) References Cited

U.S. PATENT DOCUMENTS

| | | |
|---|---|---|
| 7,085,736 B2 | 8/2006 | Keezer et al. |
| 7,159,023 B2 | 1/2007 | Tufts |
| 7,171,478 B2 | 1/2007 | Lueckhoff et al. |
| 7,191,211 B2 | 3/2007 | Tuli |
| 7,353,252 B1 | 4/2008 | Yang et al. |
| 7,373,313 B1 | 5/2008 | Kahle et al. |
| 7,543,059 B2 | 6/2009 | Johnson et al. |
| 7,792,944 B2 | 9/2010 | DeSantis et al. |
| 7,831,582 B1 | 11/2010 | Scofield et al. |
| 7,975,000 B2 | 7/2011 | Dixon et al. |
| 7,996,912 B2 | 8/2011 | Spalink et al. |
| 8,010,545 B2 | 8/2011 | Stefik et al. |
| 8,015,496 B1 | 9/2011 | Rogers |
| 8,060,463 B1 | 11/2011 | Spiegel |
| 8,073,850 B1 | 12/2011 | Hubbard et al. |
| 8,103,742 B1 | 1/2012 | Green |
| 8,185,621 B2 | 5/2012 | Kasha |
| 8,249,904 B1 | 8/2012 | DeSantis et al. |
| 8,271,887 B2 | 9/2012 | Offer et al. |
| 8,316,124 B1 | 11/2012 | Baumback et al. |
| 8,336,049 B2 | 12/2012 | Medovich |
| 2001/0039490 A1 | 11/2001 | Verbitsky et al. |
| 2002/0030703 A1 | 3/2002 | Robertson et al. |
| 2002/0194302 A1 | 12/2002 | Blumberg |
| 2003/0023712 A1 | 1/2003 | Zhao et al. |
| 2003/0041106 A1 | 2/2003 | Tuli |
| 2004/0083294 A1 | 4/2004 | Lewis |
| 2004/0139208 A1 | 7/2004 | Tuli |
| 2004/0181613 A1 | 9/2004 | Hashimoto et al. |
| 2004/0205448 A1 | 10/2004 | Grefenstette et al. |
| 2004/0220905 A1 | 11/2004 | Chen et al. |
| 2004/0243622 A1 | 12/2004 | Morisawa |
| 2005/0010863 A1 | 1/2005 | Zernik |
| 2005/0060643 A1 | 3/2005 | Glass et al. |
| 2005/0138382 A1 | 6/2005 | Hougaard et al. |
| 2005/0183039 A1 | 8/2005 | Revis |
| 2005/0246193 A1 | 11/2005 | Roever et al. |
| 2006/0085766 A1 | 4/2006 | Dominowska et al. |
| 2006/0095336 A1 | 5/2006 | Heckerman et al. |
| 2006/0122889 A1 | 6/2006 | Burdick et al. |
| 2006/0168510 A1 | 7/2006 | Bryar et al. |
| 2006/0184421 A1 | 8/2006 | Lipsky et al. |
| 2006/0248442 A1 | 11/2006 | Rosenstein et al. |
| 2006/0277167 A1 | 12/2006 | Gross et al. |
| 2006/0294461 A1 | 12/2006 | Nadamoto et al. |
| 2007/0022072 A1 | 1/2007 | Kao et al. |
| 2007/0027672 A1 | 2/2007 | Decary et al. |
| 2007/0094241 A1 | 4/2007 | Blackwell et al. |
| 2007/0124693 A1 | 5/2007 | Dominowska et al. |
| 2007/0139430 A1 | 6/2007 | Korn et al. |
| 2007/0240160 A1 | 10/2007 | Paterson-Jones et al. |
| 2007/0288589 A1 | 12/2007 | Chen et al. |
| 2008/0028334 A1 | 1/2008 | De Mes |
| 2008/0104502 A1 | 5/2008 | Olston |
| 2008/0183672 A1 | 7/2008 | Canon et al. |
| 2008/0184128 A1 | 7/2008 | Swenson et al. |
| 2008/0320225 A1 | 12/2008 | Panzer et al. |
| 2009/0012969 A1 | 1/2009 | Rail et al. |
| 2009/0164924 A1 | 6/2009 | Flake et al. |
| 2009/0204478 A1 | 8/2009 | Kaib et al. |
| 2009/0217199 A1 | 8/2009 | Hara et al. |
| 2009/0248680 A1 | 10/2009 | Kalavade |
| 2009/0254867 A1 | 10/2009 | Farouki et al. |
| 2009/0282021 A1 | 11/2009 | Bennett |
| 2009/0287698 A1 | 11/2009 | Marmaros et al. |
| 2009/0327914 A1 | 12/2009 | Adar et al. |
| 2010/0036740 A1 | 2/2010 | Barashi |
| 2010/0057639 A1 | 3/2010 | Schwarz et al. |
| 2010/0125507 A1 | 5/2010 | Tarantino, III et al. |
| 2010/0131441 A1* | 5/2010 | Gruenhagen ..... G06F 17/30867 706/45 |
| 2010/0131542 A1* | 5/2010 | Schneider ......... G06F 17/30876 707/765 |
| 2010/0131594 A1 | 5/2010 | Kashimoto |
| 2010/0138293 A1 | 6/2010 | Ramer et al. |
| 2010/0218106 A1 | 8/2010 | Chen et al. |
| 2010/0293190 A1 | 11/2010 | Kaiser et al. |
| 2010/0312788 A1 | 12/2010 | Bailey |
| 2010/0318892 A1 | 12/2010 | Teevan et al. |
| 2010/0332513 A1 | 12/2010 | Azar et al. |
| 2011/0022957 A1 | 1/2011 | Lee |
| 2011/0029854 A1 | 2/2011 | Nashi et al. |
| 2011/0055203 A1 | 3/2011 | Gutt et al. |
| 2011/0078140 A1 | 3/2011 | Dube et al. |
| 2011/0078705 A1 | 3/2011 | Maclinovsky et al. |
| 2011/0119661 A1 | 5/2011 | Agrawal et al. |
| 2011/0161849 A1 | 6/2011 | Stallings et al. |
| 2011/0173177 A1 | 7/2011 | Junqueira et al. |
| 2011/0173637 A1 | 7/2011 | Brandwine et al. |
| 2011/0178868 A1 | 7/2011 | Garg et al. |
| 2011/0185025 A1 | 7/2011 | Cherukuri et al. |
| 2011/0191327 A1 | 8/2011 | Lee |
| 2011/0197121 A1 | 8/2011 | Kletter |
| 2011/0246873 A1 | 10/2011 | Tolle et al. |
| 2011/0289074 A1 | 11/2011 | Leban |
| 2011/0296341 A1 | 12/2011 | Koppert |
| 2011/0302510 A1 | 12/2011 | Harrison et al. |
| 2012/0072821 A1 | 3/2012 | Bowling |
| 2012/0084292 A1* | 4/2012 | Liang ................ G06F 17/30899 707/741 |
| 2012/0084644 A1 | 4/2012 | Robert et al. |
| 2012/0096365 A1 | 4/2012 | Wilkinson et al. |
| 2012/0110017 A1 | 5/2012 | Gu et al. |
| 2012/0137201 A1 | 5/2012 | White et al. |
| 2012/0143944 A1 | 6/2012 | Reeves et al. |
| 2012/0150844 A1 | 6/2012 | Lindahl et al. |
| 2012/0166922 A1 | 6/2012 | Rolles |
| 2012/0198516 A1 | 8/2012 | Lim |
| 2012/0215834 A1 | 8/2012 | Chen et al. |
| 2012/0215919 A1 | 8/2012 | Labat et al. |
| 2012/0271805 A1* | 10/2012 | Holenstein ........ G06F 17/30876 707/706 |
| 2012/0284629 A1 | 11/2012 | Peters et al. |
| 2012/0317295 A1 | 12/2012 | Baird et al. |
| 2012/0331406 A1 | 12/2012 | Baird et al. |
| 2013/0007101 A1 | 1/2013 | Trahan et al. |
| 2013/0007102 A1 | 1/2013 | Trahan et al. |
| 2013/0031459 A1* | 1/2013 | Khorashadi ....... G06F 17/30905 715/234 |
| 2013/0031461 A1 | 1/2013 | Hou et al. |
| 2013/0080611 A1 | 3/2013 | Li et al. |
| 2013/0191450 A1* | 7/2013 | Bodenhamer ..... G06F 17/30899 709/203 |
| 2015/0161256 A1* | 6/2015 | Jeh ................... G06F 17/30663 707/707 |

OTHER PUBLICATIONS

Teevan, J., et al., "Changing How People View Changes on the Web," 2009, Proceedings of the 22$^{nd}$ Annual ACM Symposium on User Interface Software and Technology, New York, 2009, pp. 237-246.

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

Bango, Rey "How JS & Ajax work in Opera Mini 4", Novmber 2, 2007, XP055050107, Retrieved from the Internet.

Brinkmann, M, "Record and Share your browser history with Hooeey," ghacks.net, Feb. 26, 2008, 6 pages, printed on Jan. 25, 2013.

Considine, A, "The Footprints of Web Feet," The New York Times, Mar. 4, 2011, 3 pages, printed on Jan. 25, 2013.

(56) References Cited

OTHER PUBLICATIONS

EyeBrowse: Record, Visualize and Share your Browser History, Information Aesthetics, Sep. 18, 2009, 2 pages, printed on Jan. 25, 2013.
Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.
Gabber et al., "How to Make Personalized Web Browsing Simple, Secure, and Anonymous," Financial Cryptography, 16 pages (1997).
Gingerich, Jason, "Keycorp Making Site Into Portal," KRTBN Knight-Ridder Tribune Business News (South Bend Tribune, Indiana), Oct. 25, 1999, 2 pages.
Hopper, D. Ian, "Desktops Now Have Power to Comparison-Shop," Oct. 18, 1999, printed from http://www.cnn.com/TECH/computing/9910/18/r.u.sure/index.html, 3 pages.
Van Kleek, M, Introducing "Eyebrowse"—Track and share your web browsing in real time, Haystack Blog, Aug. 28, 2009, 3 pages, printed on Jan. 25, 2013.
Web page titled "RSS Ticker: Add-ons for Firefox," https://addons.mozilla.org/en-US/firefox/addon/rss-ticker/, 3 printed pages, printed on Feb. 7, 2013.
Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.
Chen, H., et al., "Bringing Order to the Web: Automatically Categorizing Search Results," Proceedings of the SIGCHI Conference on Human Factors in Computing Systems, Apr. 1-6, 2000, pp. 145-152.

* cited by examiner

CONTENT SELECTION BASED ON TARGET DEVICE CHARACTERISTICS

BACKGROUND

Various computing devices configured with different combinations of hardware and software components can connect to networks of varying capacities to request the same network-accessible content. In a common application, computing devices request content pages over the internet. Users of the computing devices may have different experiences based, for example, on the configurations of the computing devices and the types of internet connections available to the devices. Content may appear differently on different computing devices, response times may be different, etc.

Browsing behaviors of users are monitored by computing service providers, such as internet services providers (ISPs) and search providers, to determine, among other things, which content is popular and which content is related. Users of client devices with a wide array of hardware and software configurations can each have access to such popularity rankings or relation mappings regardless of whether their client device is capable of a satisfactory user experience when viewing popular or related content. Users may not have a reliable way of knowing in advance whether a popular network resource, or a network resource related to previously requested resources, is worth viewing on the user's device.

BRIEF DESCRIPTION OF THE DRAWINGS

Embodiments of various inventive features will now be described with reference to the following drawings, wherein.

DETAILED DESCRIPTION OF SPECIFIC EMBODIMENTS

The present disclosure is directed to recommending network-accessible content to users based (or based in part) on characteristics of the users' computing devices. Specifically, aspects of the disclosure will be described with regard to the analysis of content requests from a user and any number of other users to identify content that is popular or otherwise of interest to the user. Identified content can be recommended to the user if it is optimized for, or determined to provide a satisfactory user experience on, computing devices which share one or more characteristics with the computing device of the user. For example, relevant device characteristics can include: central processor unit (CPU) speed; available memory; network latency; network bandwidth; display size; display resolution; input type; geolocation; or installed codecs. Other aspects of the disclosure relate to selecting requested content based at least partly on device characteristics in addition to, or instead of, recommended content. As with recommended content, the requested content is selected or modified to provide an optimized or otherwise satisfactory user experience on client devices which share one or more characteristics with the computing device of the user. Further aspects of the present disclosure relate to receiving performance metrics from client devices. The performance metrics, such as CPU utilization, memory utilization, and the like can be utilized to fine-tune future recommendations and user experience determinations. For example, a browser or other component of a client device can report performance metric data, and also device characteristic data, to a server.

Figure 1:
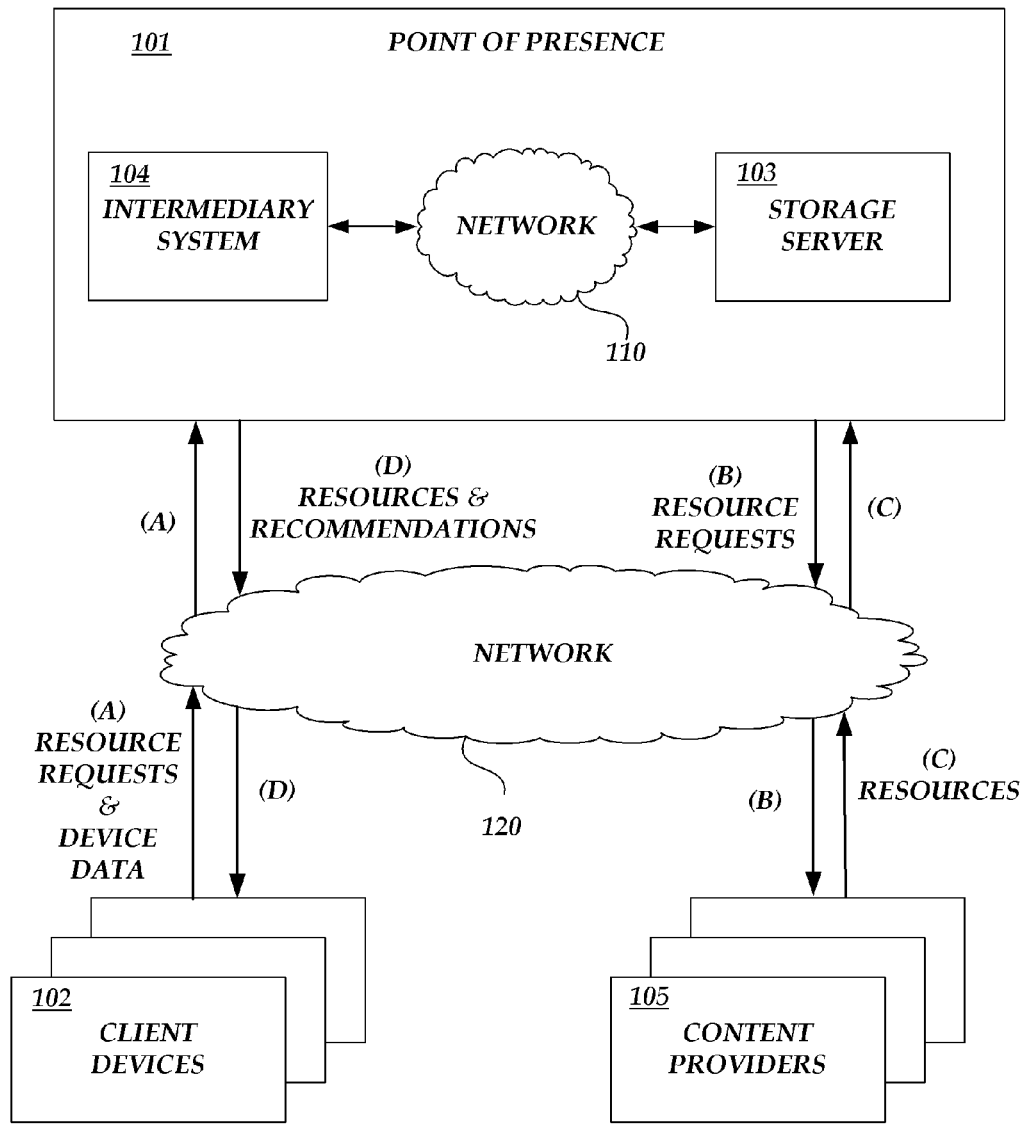
FIG. 1 is a block diagram illustrative of a content delivery environment including a network computing provider point of presence and a number of client devices and content providers.

FIG. 1 is a block diagram illustrative of a networked computing environment for the management and processing, by a network computing provider, of content requests by any number of clients. A network computing provider can provide computing services, such as computing capacity, storage capacity, content hosting and delivery, proxy services, and the like. The computing services can be provided to a private user base, to paying customers, to the general public for free, or to any combination thereof. As illustrated in FIG. 1, a network computing provider may provide computing services through one or more point-of-presence 101 (POP) locations. Each POP 101 may be located close to a concentration of users or potential users. A single POP 101 provides computing services to any number of client devices 102. Illustratively, the POP 101 of FIG. 1 is configured to serve as a proxy between client devices 102 and content providers 105.

The POP 101 can include a intermediary system 104 and a storage server 103 in a single physical location. The intermediary system 104 can be any computing system that serves as an intermediary between a client device 102 and a content provider 105. For example, the intermediary system 104 can be an intelligent proxy server, a recommendation server, or some other device or group of devices that generates recommendations or otherwise selects content in response to a request form a client device 102. In some embodiments, the intermediary system 104 and storage server 103 are considered to be logically grouped, regardless of whether the components, or portions of the components, are physically separate. For example, a network computing provider may maintain separate POPs 101 for providing the intermediary system 104 and the storage server 103. Any number of POPs 101 can be geographically distributed throughout the communication network 110 in a manner to best serve various demographics of client devices 102. Additionally, the network computing provider can be associated with various additional computing resources, such as content delivery networks (CDNs) and the like.

The intermediary system 104 and storage server 103 can each be implemented as hardware, such as a server computing device, or as a combination of hardware and software. In addition, the intermediary system 104, storage server 103, or both may include one or more physical servers or other computing devices, including devices that are geographically remote from one another. The intermediary system 104 and storage server 103 can be combined on one server computing device or separated individually or into groups on several server computing devices. In some embodiments, the POP 101 can include additional or fewer components, multiple instances of a single component, etc. For example, the POP 101 can include any number of storage servers 103. The storage servers 103 can be configured to store data about the browsing trails of the client devices 102, popular content, the performance of the client devices 102 when processing content, etc. The intermediary system 104 and storage server 103 can communicate with each other over a network 110. The network 110 may, for example, be a private network or subnet, such as a corporate or university network that is wholly or partially inaccessible to non-privileged users.

The client devices 102 can correspond to a wide variety of computing devices, including personal computing devices, laptop computing devices, hand-held computing devices, terminal computing devices, mobile devices (e.g., mobile phones, tablet computing devices, etc.), wireless devices, electronic readers, media players, and various other electronic devices and appliances. The client devices 102 generally include hardware and software components for establishing communications over a communication network 120, such as a wide area network or local area network. For example, the client devices 102 may be equipped with networking equipment and browser software applications that facilitate communications via the internet or an intranet, as described below with respect to FIG. 2.

The content providers 105 illustrated in FIG. 1 can correspond to a logical association of one or more computing devices for hosting content and servicing requests for the hosted content over the network 120. For example, a content provider 105 can include a web server component corresponding to one or more server computing devices for obtaining and processing requests for content (such as content pages) from the client devices 102, the POP 101, or other devices or service providers. In some embodiments, or more content providers 105 may be a content delivery network (CDN) service provider, an application service provider, etc.

The network 120 may be a publicly accessible network of linked networks, possibly operated by various distinct parties, such as the Internet. In other embodiments, the network 120 may include a private network, personal area network, local area network, wide area network, cable network, satellite network, cellular telephone network, etc. or combination thereof, each with access to and/or from the Internet.

In general operation, a user of a client device 102 can use a software browser application to request a network resource, such as a content page. As described herein, the request (A) can be transmitted, over the network 120, to a POP 101 instead of directly to a content provider 105. The request can be transmitted to the intermediary system 104 of the POP 101, or it can be routed to the intermediary system 104 by the POP 101 or some component thereof. The intermediary system 104, can request (B), receive (C), and transmit (D) the requested content to the client device 102.

The intermediary system 104 can provide additional services to the client device 102 in addition to standard proxy services. For example, the intermediary system 104 can recommend popular content or content that may otherwise be of interest to the user of the client device 102. Furthermore, the intermediary system 104 can tailor the recommendations to the specific characteristics of the client device 102. In some embodiments, the browser or some other component of the client device 102 can collect data about the characteristics of the client device 102 and transmit (A) the data to the intermediary system 104. The device characteristics data can be transmitted either with requests for content, as shown in FIG. 1, or independent of any request for content, such as upon device startup, during idle periods, on a predetermined schedule, during user account setup, etc.

In one illustrative example, a client device 102 can have a display that has a limited viewable area. For example, the client device 102 can be a netbook, tablet, smartphone, e-reader, media player, etc. having a small display. When viewing a content page on such a display, the user may need to perform zooming and/or scrolling operations in order to obtain a satisfactory view. In another example, a client device 102, such as a mobile phone, may have a low-speed network connection or a limited amount of available memory. The intermediary system 104 can use the device characteristic data to determine recommendations for content that is optimized or otherwise more user-friendly for devices with the same or similar characteristics as the client device 102. For example, the intermediary system 104 may locate content that is specifically designed to be viewed on the type of display the client device 102 has, or that is optimized for transmission over low-speed network to devices with limited memory. The intermediary system 104 can then transmit (D) a recommendation for the optimized content to the client device 102. The recommendations can be transmitted to the client device 102 along with requested content, as shown in FIG. 1, or independent of any requested content, such as during idle periods, on demand by the user, etc.

The intermediary system 104 can store browsing requests and device characteristic data for any number of client devices in the storage server 103 or some other component. The intermediary system 104 may also receive performance metrics from client devices 104 indicating how requested and recommended content performed on the specific device. For example, a client device 102 may execute a software browser application, or some other component, that monitors and reports conditions and events that evidence the suitability of the accessed content items to the client device 102. For example, the browser on the client device 102 can notify the intermediary system 104 of memory utilization and CPU utilization during rendering and user interaction a network resource. The intermediary system 104 can store these performance metrics in the storage server 103 as well. When the intermediary system 104 is generating recommendations, it can access the browsing data, device characteristic data, and performance metrics. The intermediary system 104 can then determine which resources are popular and which resources the user of a specific client device 102 may be most interested in. The intermediary system can then determine which of those resources typically experience satisfactory or optimal performance on devices with characteristics similar to the client device 102. The intermediary system 104 can then transmit recommendations to the client device 102.

Figure 2:
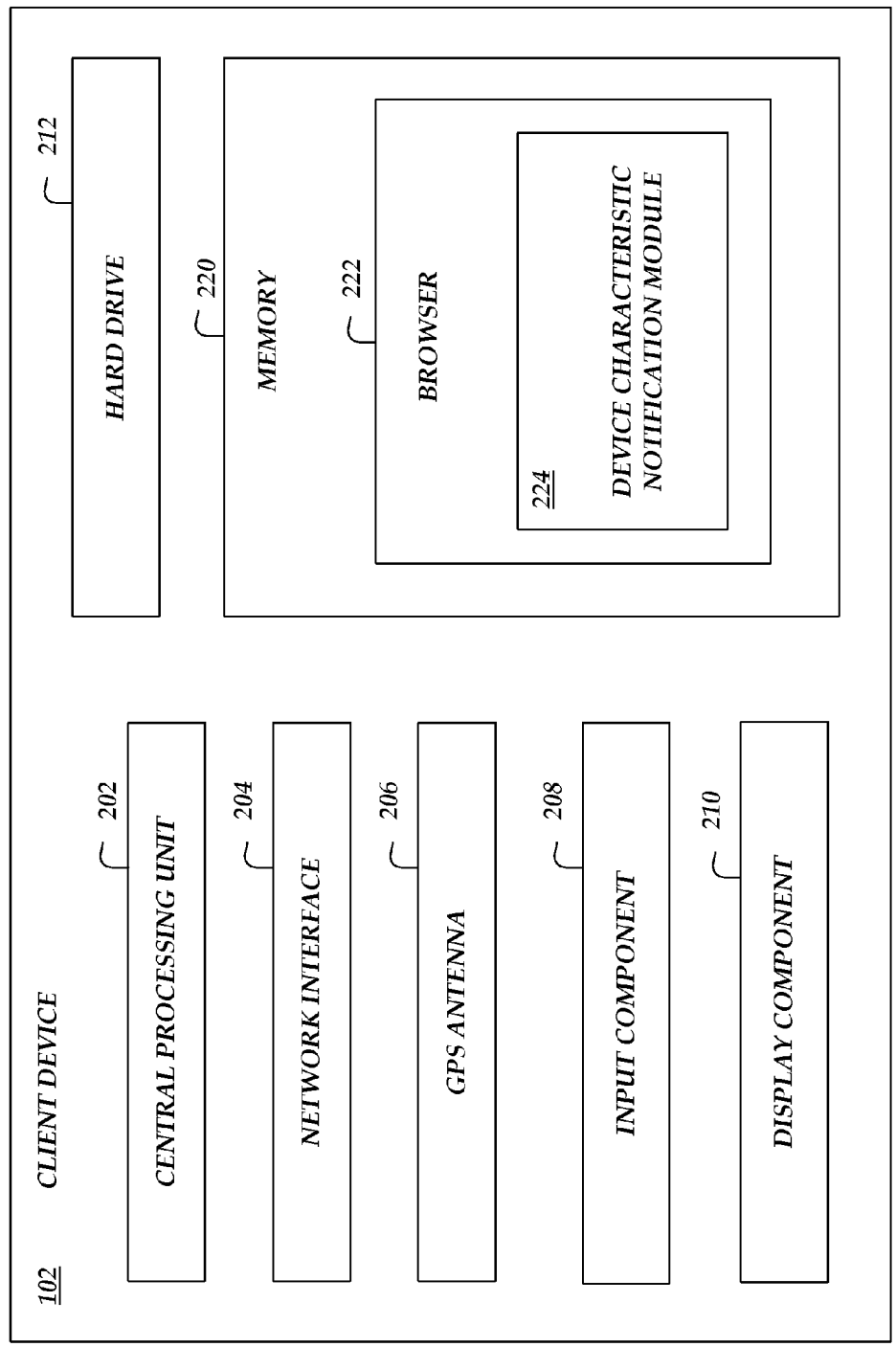
FIG. 2 is a block diagram of an embodiment of the client device of FIG. 1, illustrating example components of a client device.

Referring now to FIG. 2, one embodiment of a client device 102 is illustrated in detail. The client device 102 includes a central processing unit (CPU) 202, a network interface 204, a global positioning system (GPS) antenna 206, an input component 208, a display component 210, a hard drive 212, and a memory 220. The network interface 204 can provide connectivity to one or more networks or computing systems. For example, the network interface 204 can communicate over a wired Ethernet connection, a Wi-Fi antenna, a cellular telephone antenna, or any other wired or wireless communication interface. The CPU 202 can receive information and instructions from other computing systems or services via the network interface 204. The CPU 202 can communicate to and from memory 220 and output information to a display component 210, such as a video screen. The CPU 202 can accept input from an input component 208, such as a keypad, keyboard, mouse, digital pen, voice activated input, headset, etc. In some embodiments, the client device 102 may include more or fewer components than listed above. For example, a client device 102 may include several CPUs 202, but no GPS antenna 206. In another example, a client device 102 may be configured with a single component that serves as both an input component 208 and a display component 210, such as a touch screen.

The memory 220 of the example client device 102 illustrated in FIG. 2 includes a software browsing application (browser) 222. The browser 222 can be used to request, view, and interact with network content, such as content pages, images, videos, applets, documents, and the like. The browser 222 can be stored on the hard drive 212, for example when the client device 102 is powered off or when the user of the client device 102 is not using the browser 222. During use, the browser 222 is generally located in memory 222. The browser 222 includes a device characteristic notification module 224. The device characteristic notification module 224 can detect characteristics of the client device 102, such as: CPU 202 type and speed; number of CPUs 202; hard disk 212 free space and speed; available memory 220 space; network type, capacity, throughput, and latency; internet service provider (ISP); whether the client device 102 is behind an additional proxy, separate from the intermediary system 104 of the POP 101; geolocation or GPS coordinates from the GPS antenna 206; installed codecs and plugins; display component 210 size, resolution, and refresh rate; and input component 208 type. The device characteristic notification module 224 or some other component of the browser 222 or client device 102 can also collect data regarding various user interactions, such as how long a user spends on a content page, where a user scrolled or zoomed on a content page, etc. The device characteristic notification module 224 can then transmit, via the network interface 204, data about the characteristics and user interactions to the intermediary system 104.

In operation, the client device 102 can communicate with the POP 101 and other computing devices over the network 120, as described herein. The network interface 204 can facilitate such communication for the client device 102. Based on the instructions of the browser 222 in memory 220 and input from a user interacting with the input component 210, the client device 102 can request, receive, and process network content for display. The client device 102 can also receive, from the POP 101, recommendations for network content that was not requested, such as content that may popular or otherwise of interest to the user of the client device 102. As described above, the recommendations can be further tailored based on the detected device characteristics that have been sent to the intermediary system 104 by the device characteristic detection module 224. For example, the intermediary system 104 may recommend a local news web site or individual content page that has been optimized for small displays if the intermediary system 104 receives data indicating that the client device 102 is a mobile phone located in a specific geographic region covered by a popular news source which provides mobile versions of its content pages. The intermediary system 104 can further tailor its recommendations based on the browsing history of the user of the client device 102, for example by recommending sports news pages rather than general news pages if the user typically browses sports-related content and rarely or never browses other news content.

Figure 3:
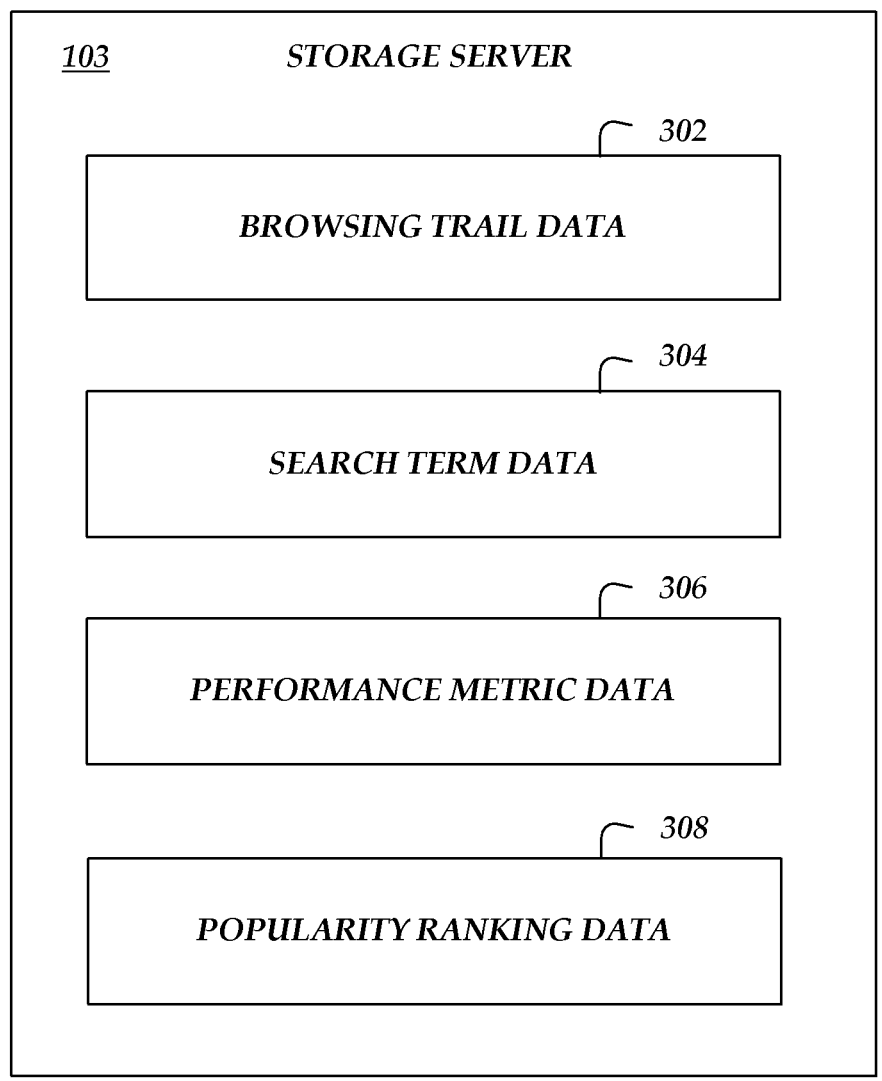
FIG. 3 is a block diagram of an embodiment of the storage server of FIG. 1, illustrating example components of a storage server.

FIG. 3 illustrates an example storage server 103. Illustratively, the storage server 103 can be configured to provide electronic data storage for browsing trail data 302, search term data 304, performance metric data 306, and popularity ranking data 308. In some embodiments, the various types of data are sent to the storage server 103 by the intermediary system 104. For example, browsing trail data 302, search term data 304, and performance metric data 306 can be received by the intermediary system 104 from client devices 102, and stored in the storage server 103. The data can be retrieved by the intermediary system 104 and used to created popularity ranking data 308, which can then be stored in the storage server 103. In some embodiments, the storage server 103 is a single physical server computing device, a collection of server devices, a virtual machine hosted by one or more physical server computing devices, etc. The storage server 103 can host a relational database management system. The various types of data can be stored within one or more databases managed by the relational database management system. In some embodiments, the each type of data can be stored within a different storage server 103.

The browsing trail data 302 can include data received, by the intermediary system 104, from any number of client devices 102. As described above with respect to FIG. 1, a client device 102 can communicate with an intermediary system 104, transmitting requests for network resources, and receiving the requested network resources from the intermediary system 104. The intermediary system 104 can store the requests in the storage server 103 for later use in determining recommendations, as described below. Because the intermediary system 104 of some embodiments receives and processes all requests from a client device 102 during a browsing session, the intermediary system 104 in such embodiments has access to the entire browsing trail of the client device 102. Other service providers, such as search engines, have access only to the search trail of the user, and to which search results a user selected for viewing, for example by clicking a link on a content page listing search results. After the user has navigated away from a content page under the control of the search provider, the search provider no longer has access to the browsing requests of the client device 102 without using a plugin or some other component.

In one embodiment, browsing trail data 302 can be stored as individual records corresponding to individual browsing requests. The records can include, for example, an identifier such as a URL for the requested content, an identifier for the requesting user or client device 102, and a time stamp. Some of this information can be omitted, and additional information can also be stored, such as characteristics of the client device 102. In some embodiments, the browsing trail data 302 record can also indicate the content page that the user navigated from or to, immediately before or after the content page that the record corresponds to. Such data can be used by the browsing trail analysis module 404 or some other component of the intermediary system 104 to determine which page or pages may be related to a particular content page. Other data that may saved with a browsing trail data 302 record includes measurements of how long a user viewed the content page. Such data can be useful in determining, for example, whether it was possible that the user read all or a substantial portion of the content page, or instead the user navigated away too quickly to read a substantial portion.

Search term data 304 can be stored at the storage server 103 as well. Similar to the browsing trail data 302, client devices 102 can submit search requests to the intermediary system 104. The search requests can be stored by the intermediary system 104 and passed on to the target search engine or a content provider 105 to submit the search. In some embodiments, the intermediary system 104 may serve as a search provider. The search term data 304 can be used by the intermediary system 104 to determine which page or pages may be related to a particular content page. For example, the search term data can be used by the browsing trail analysis module 404 to supplement the browsing trail data 302. The browsing trail analysis module 404 can determine whether certain browsing requests tend to be associated with certain search terms.

Performance metric data 306 can include data received from client devices 102 regarding how a requested network resource affected the performance of the client device 102. For example, some resources, such as content pages with embedded video content, can be particularly CPU intensive and network bandwidth intensive. Client devices 102 with slow CPUs 202 or network connections may experience performance degradation when processing and displaying large video files. In another example, a content page may include a modest number of small image files, and the same client device 102 may not experience any performance degradation. In either example, the client device 102 can transmit performance data to the intermediary system 104. Performance metric data 306 can be stored as individual records including an identifier of the client device 102, an identifier of the active content page, an identifier of the of the characteristic being measured (such as CPU utilization), and a measurement (such as 100%). The intermediary system 104 can store the performance metric data 306 in the storage server 103 for later use. For example, the intermediary system 104 can use performance metric data 306 to dynamically adjust content processing, and also to tailor content recommendations for devices with particular characteristics so that the intermediary system 104 does not recommend a content page that will degrade the performance or otherwise cause a poor user experience at the client device 102.

In some embodiments, performance data 306 can include user interaction data. User interactions with content, such as zooming interactions, scroll events, and the like can be recorded and reported to the intermediary system 104, typically in conjunction with some indication of the client device 102 or some specific device characteristic. For example, some touch screen enabled devices, such as mobile phones, have small displays. A user viewing a content page on such a device may zoom in substantially and repeatedly in an effort to read any text or otherwise obtain a satisfactory view of the content page. By aggregating such data over the course of multiple devices and users, the intermediary system 104 can refrain from recommending web sites or individual content pages to specific mobile devices when the content pages are associated with a pattern of zooming or scrolling interactions indicating that the content page is not well suited for display on the particular device.

The browsing trail data 302 and performance metric data 306 can later be accessed by the intermediary system 104 or some component thereof in order to create popularity ranking data 308, which can then be stored in the storage server 103. The intermediary system 104 can use the browsing trail data 302 of multiple users to determine which content items are popular at the present time, which content items are popular among browsing trails that include a requested content item, which content items are popular among client devices 102 with certain characteristics, etc. Data about the popularity determinations can be stored as popularity ranking data 308. In some embodiments, the popularity ranking data 308 can be stored as individual records corresponding to individual popularity determinations. For example, a record of popularity ranking data 308 can include: an identifier, such as a URL for the popular content; a popularity ranking, score, or value; data about the characteristics of client devices that the recommendation is most appropriate for; and an expiration date for the popularity determination.

Figure 4:
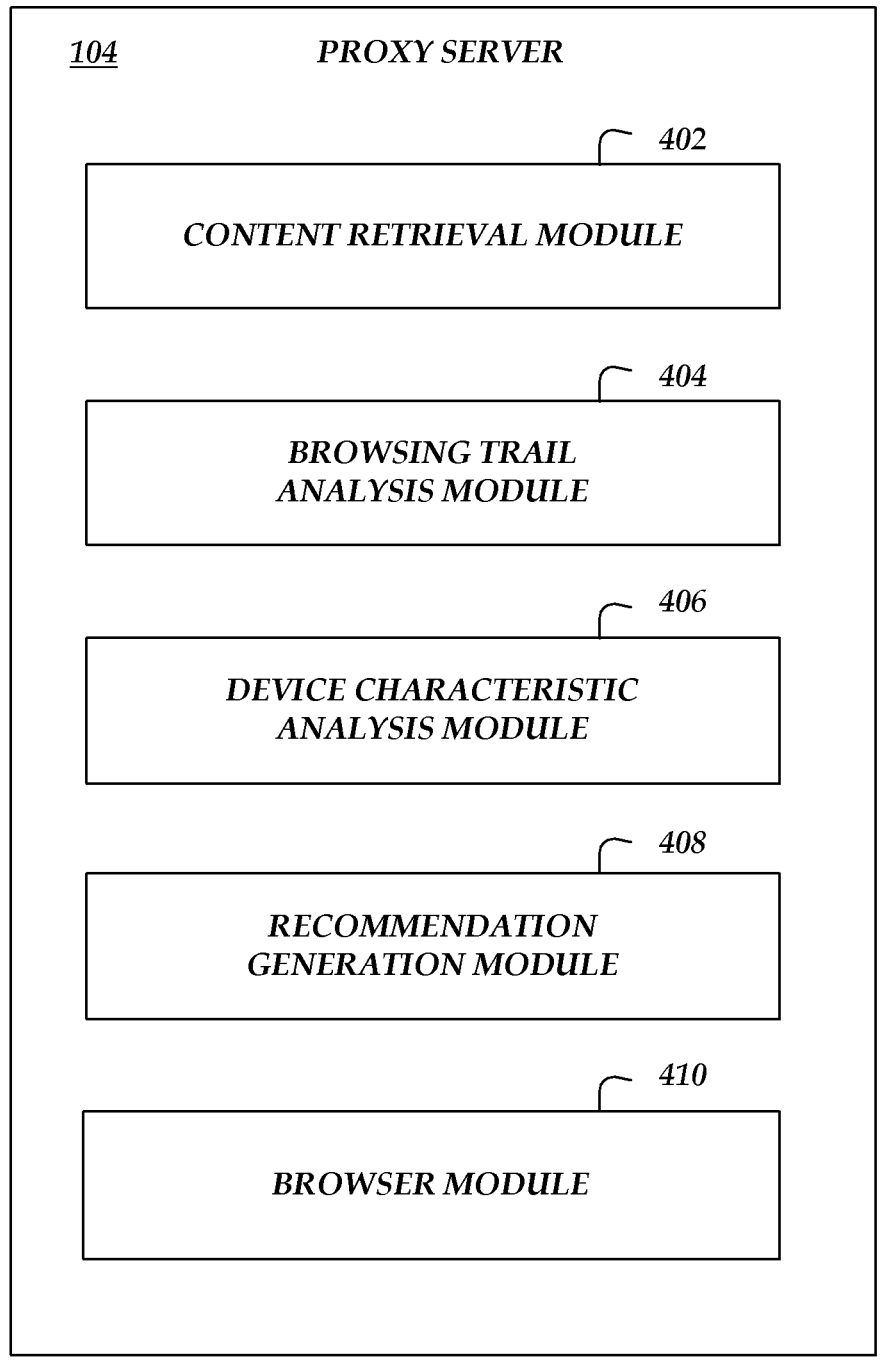
FIG. 4 is a block diagram of an embodiment of the intermediary system of FIG. 1, illustrating example components of an intermediary system.

FIG. 4 is a block diagram of an illustrative intermediary system 104. The intermediary system 104 illustrated in FIG. 4 includes a content retrieval module 402, a browsing trail analysis module 404, a device characteristic analysis module 406, a recommendation generation module 408, and a browser module 410. Each of the modules can be implemented as hardware or as software running on hardware. In addition, the intermediary system 104 can be implemented as hardware, such as a server computing device, or as a combination of hardware and software. In some embodiments, the modules of the intermediary system 104 can be distributed across two or more physical computing devices or each deployed on its own computing device.

The content retrieval module 402 can receive requests, from any number of client devices 102, for network resources, such as content pages. As described above with respect to FIG. 3, the content retrieval module 402 can store the requests in the storage server 103. The content retrieval module 402 can then retrieve the requested content from a content provider 105, and return the content to the requesting client device 102. In some embodiments, the content retrieval module 402 or some other component of the intermediary system 104 can pass the retrieved content to a browser module 410 for processing, as described in detail below, in order to reduce the computing load of the client device 102. A processed result, such as a partially or fully assembled and rendered content page, can then be transmitted to the requesting client device 102. In some embodiments, the content retrieval module 402 or some other component of the intermediary system 104 can call, instantiate, or otherwise cause to be executed the recommendation generation module 408 to generate recommendations associated with the request, before or after the requested content is transmitted to the client device 102.

The browsing trail analysis module 404 can be executed at the time recommendations are generated, at the time a new request is received, after a number of requests exceeding a threshold have been received, on a scheduled basis, or as a continuously running background process independent of any triggering event. The browsing trail analysis module 404 can retrieve browsing trail data 302 and search term data 304 from the storage server 103, and analyze patterns in the data to determine which resources tend to be requested contemporaneously with each other, which resources are popular or gaining popularity, and the like. In similar fashion, the browsing trail analysis module 404 can consider search term data 304 when making such determinations.

The browsing trail analysis module 404 can calculate a relative or absolute popularity ranking of content, either as a whole or separated into groups with common characteristics. For example, a request for a specific news content page may often follow or be followed by a request for one of two other content pages. The first of the two other content pages may have been requested 60% of the time during the same browsing session as the news content page, while the second of the two other content pages may have been requested only 30% of the time during the same browsing session. No other content page may have been requested more than 10% of the time during the same browsing session as the news content page. The browsing trail analysis module 404 can associate the two other content pages with the news content page by entering records into the popularity ranking data 308 in the storage server 103. For example, two records can be entered into the popularity ranking data 308, each with an identifier, such as a URL, of the news content page and an identifier, such as a URL, of the popular content page associated with the news content page. In some embodiments, a ranking metric may be included, such as data indicating that the first of the two other content pages is the most popular content page during sessions involving the news content page. Alternatively, the ranking metric can be the request percentage, or some other calculated value or score indicating a relative or absolute popularity.

In some embodiments, the browsing trail analysis module 404 can consider other factors when determining popular content. For example, if the browsing trail data 302 contains information about how long a user viewed a content page, the browsing trail analysis module 404 can discount any popularity values or ranking of such a page based on an assumption that it is generally not useful. If the user navigated away too quickly to read a substantial portion of the content page, that fact may indicate that the content page is not necessarily helpful even if it manages to be requested often. In some embodiments, the browsing trail analysis module 404 can determine rankings or values not based on popularity. For example, the browsing trial analysis module 404 may be configured to identify similarities between requested or search content and content which may be obscure or otherwise difficult to find.

The device characteristic analysis module 406 can retrieve performance metric data 306 from the storage server 103 and determine which network resources are optimized or otherwise provide user friendly experiences on client devices 102 with certain characteristics, and which network resources cause performance degradation or otherwise provide poor user experiences on client devices 102 with certain characteristics. For example, the device characteristic analysis module 406 can determine that on a particular model of a tablet computer, Flash content does not display efficiently or at all, perhaps due to limited memory or lack of a codec for the content. In another example, the device characteristic analysis module 406 can determine that a specific content page, such as www.xyzwebsite.com, loads slowly on a particular model or class of mobile phones, and therefore the content page should not be recommended to that model or class of phones.

The recommendation generation module 408 can combine the results generated by the browsing trail analysis module 404 and the device characteristic analysis module 406 to generate recommendations that are tailored to a specific client device 102 at a specific point in time. For example, a mobile phone that is requesting content pages which provide maps and driving directions can be given a recommendation for the most popular mapping content page among mobile phones with similar characteristics, such as a built-in GPS antenna. In another example, a desktop computer may be viewing streaming media content pages. The recommendation generation module 408 can compile or otherwise obtain a listing of the most popular high-definition streaming media, as determined by requests within the past 24 hours, which have similarities such as tags, titles, or categorizations with content recently accessed by the desktop computer of this example. The recommendation generation module 408 can then generate recommendations based on that listing. The recommendation generation module 408 can further base its recommendations on the specific streaming media that has been requested by the desktop computer client device 102, recommending streaming media content that has been requested within the same browsing session as one or more items of streaming media that have been requested by the desktop computing client device 102 during the current browsing session. In some embodiments, popularity is not a criteria or condition for generating recommendations. For example, users may already know of (or know how to find) popular content, and therefore the recommendations can be generated which focus on obscure or otherwise unknown content that is relevant to the user's interests.

In some embodiments, the intermediary system 104 can be configured to further optimize the content for the client device 102 by pre-processing it in a content rendering engine, such as a browser module 410, prior to transmitting it to the user. As described herein, a component of the intermediary system 104, such as the content retrieval module 402, can be configured to retrieve requested content. The intermediary system 104 may include a browser module 410 for performing the same or similar processing at the POP 101 as the browser 222 performs at the client device 102. In some embodiments, the content retrieval module 402 can determine which processing tasks to perform at the browser module 410 in addition to, or instead of, the processing tasks normally performed by a browser 222 on a client device 102. The browser module 410 may be in communication with the browser 222 of the client device, allowing the browsers to exchange processing and user interaction information. One example of a browser module 410 executing on a intermediary system 104 or other network computing component, and the browsing configurations and processing that facilitate usage of the browser module 410, is described in U.S. patent application Ser. No. 13/174,589, the disclosure of which is hereby incorporated by reference.

In some embodiments, the intermediary system 104 can utilize client device 102 characteristic data to determine which processing tasks to perform in the browser module 410. For example, if a content page has a large, high-resolution image embedded within it, while a requesting client device 102 has only a small, low-resolution display, the image can be rendered by the browser module 410 and downsized into a file size optimized for viewing on a small display. In some embodiments, the browser module 410 is not utilized to perform such adjustments, but rather a separate component of the intermediary system 104 performs the process, or the intermediary system 104 accesses different pre-existing versions of content pages and embedded resources based on the device characteristics.

Figure 5:
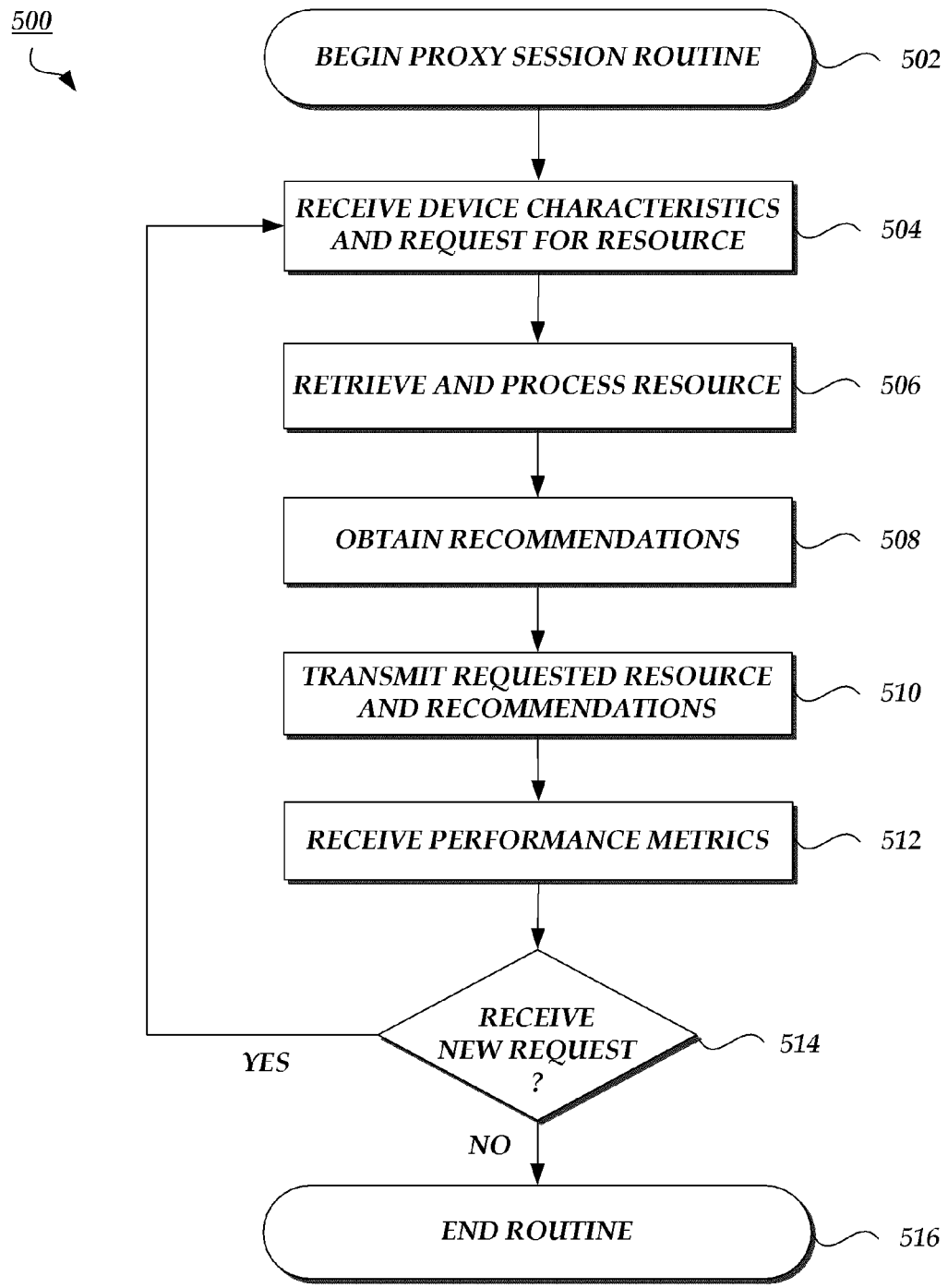
FIG. 5 is a flow diagram illustrating a sample browsing session routine implemented by an intermediary system.

FIG. 5 is a flow diagram illustrative of an example proxy session routine 500, as implemented by an intermediary system 104. The proxy session routine 500 can be used to implement recommendation generation and transmission based on prior browsing requests and device characteristics.

The routine 500 begins at block 502 with the initiation of a browsing session by a client device 102. For example, a client device 102 may be used by a customer of a network computing provider with a number of POPs 101, and the client device 102 may automatically connect to a POP 101 upon establishment of a network connection. In some embodiments, the browsing session may begin in response to the intermediary system 104 receiving a first request from the client device 102 in a period of time. With reference to an illustrative example, a user may cause a client device 102 configured with a touch screen to load a browser 222 for accessing content provided by one or more content providers 105. Subsequent to the browser 222 being loaded, a user or automated process may cause the client device 102 to transmit a request to access content from a content provider 105. For example, the user may select or enter a URL (e.g., http://www.xyzwebsite.com) into an address bar of the browser 222, causing the client device 102 to transmit a request for the content page to a POP 101. Responsive to the request received from the client device 102, the POP 101 may instantiate or cause to have instantiated one or more computing components, such as an intermediary system 104, that will host a browser 410.

At block 504, the intermediary system 104 receives, from the client device 102, a request for a network resource, such as a content page at a specific URL. In some embodiments, the intermediary system 104 may also receive device characteristic data from the client device 102. The device characteristic data may be sent by the client device 102 only with the first request of the browsing session, or with every request. In some embodiments, the device characteristic data may be sent at the initiation of the browsing session, such as during the actions described in block 502 above, or throughout the browsing session but independent of any request. The device characteristic data may include specific details about physical characteristics of the client device 102, such as CPU type, available memory, and the like. The device characteristic data may additionally or alternatively include a model number or other identifier for the client device 120 or some component thereof. The intermediary system 104 can use the model number or identifier to obtain device characteristics from a data store, for example on the storage server 103, or from some third-party service.

At block 506, the intermediary system 104 can initiate retrieval of the requested content page. The intermediary system 104 may also initiate pre-processing of the requested content page in the browser module 410. Returning to the example above, the intermediary system 104 can request the identified content page(s) from one or more content providers 105 or a local or associated cache component. The intermediary system 104 can determine a browsing or processing configuration for the requested content based on previously received device characteristic data. Illustratively, the intermediary system 104 may process and transmit modified portions of the network content. The modifications can be selected and implemented to optimize or otherwise improve the performance or usability of the content on a client device 102 with certain characteristics. In some configurations, entire content page can be processed and rendered in the browser 410 of the intermediary system 104, and a visual representation of the rendered page can be created for the client device 102 to reduce the amount of bandwidth and processing required by the client device 102 to receive and display the requested content page. In other configurations, the browser 410 performs little or no processing, but instead the content retrieval module 402 or some other component of the intermediary system 104 retrieves a version of the requested content that is already optimized for the characteristics of the client device 102. For example, the intermediary system 104 may maintain a cache or have access to a cache of popular content items, popular pages, related pages, and other resources.

At block 508, the intermediary system 104 can initialize the recommendation generation module 408 to generate recommendations for the client device 102 based on the received requests and device characteristic data. In some embodiments, the recommendation generation module 408 is a continuously running background process that need not be initialized. In such cases, the intermediary system 104 can obtain recommendation information from the storage server 103 or directly from the recommendation generation module 408.

At block 510, the intermediary system 104 transmits the requested content page to the client device 102. If the content page has been partially or completely processed in the browser 410, then the intermediary system 104 transmits the initial processing result rather than the retrieved components of the content page. For example, the browser 410 may have parsed and processed the received files associated with the content page, such as the HTML file, images files, etc., in block 406 above. As with a browser 222 of a client device 102, the browser 410 of the intermediary system 410 can build a document object model (DOM) of the content page, and the DOM or a serialized version thereof can be transmitted to the client device 102 instead of the files retrieved from the content source 105. In addition, the intermediary system 104 can transmit any recommendations generated based on the characteristics of the client device 102 and the requested content page or browsing trail. For example, the intermediary system 104 can transmit a list of URLs that can be used by the client device 102 to retrieve or display links to the recommend content pages. In some embodiments, the intermediary system 104 can retrieve recommended content pages or portions thereof from content providers 105 prior to receiving a request from the client device 102 for the recommended content page. The retrieved objects can be transmitted to the client device 102 for storage in a local cache, or they can be held at the intermediary system 103 in a cache or in the browser 410. The recommendation URLs or files may be transmitted to the client device 102 with the requested content or at any other time. For example, they can be transmitted during idle periods when the client device 102 is not utilizing its network connection.

At block 512, the intermediary system 104 can receive performance metrics from the client device 102. The performance metrics can be measurements recorded during processing or display of the requested content. The intermediary system 104 can store the performance metrics as performance metric data 404 in the storage server 103. The performance metrics data 404 can then be used later by the intermediary system 104 to fine tune its recommendations or to determine processing configurations for assigning processing tasks to the browser 410.

At decision block 514, the intermediary system 104 determines whether another request has been received from the client device 102. If the intermediary system 104 receives another request from the client device 102, execution of the routine 500 returns to block 504. Otherwise, execution proceeds to block 516. The intermediary system 102 can monitor the connection with the client device 102 to ensure that the client device 102 is still connected. Alternatively, the intermediary system 102 can wait for a command from the client device 102, until passage of a predetermined period of time occurs, after which execution of the routine 500 proceeds to block 516, where the routine 500 terminates.

In some embodiments, portions of the routine 500 can be performed by a device other than an intermediary system. For example, client devices 102 can report their requests (and associated performance data) to a system or recommendation service, that does not include, and is not associated with, a intermediary system 104. The recommendation service can receive data regarding client device 102 requests and device characteristics. The recommendation service can analyze the data as described herein and generate recommendations for particular users based on request history and device characteristics. Additionally, the disclosed methods can be used by search provider to rank search results for users. For example, when a user submits a search query to an internet search engine, the suitability of each responsive item to the user's device may be considered (among other factors) in determining its ranking within the search results listing.

Figure 6A:
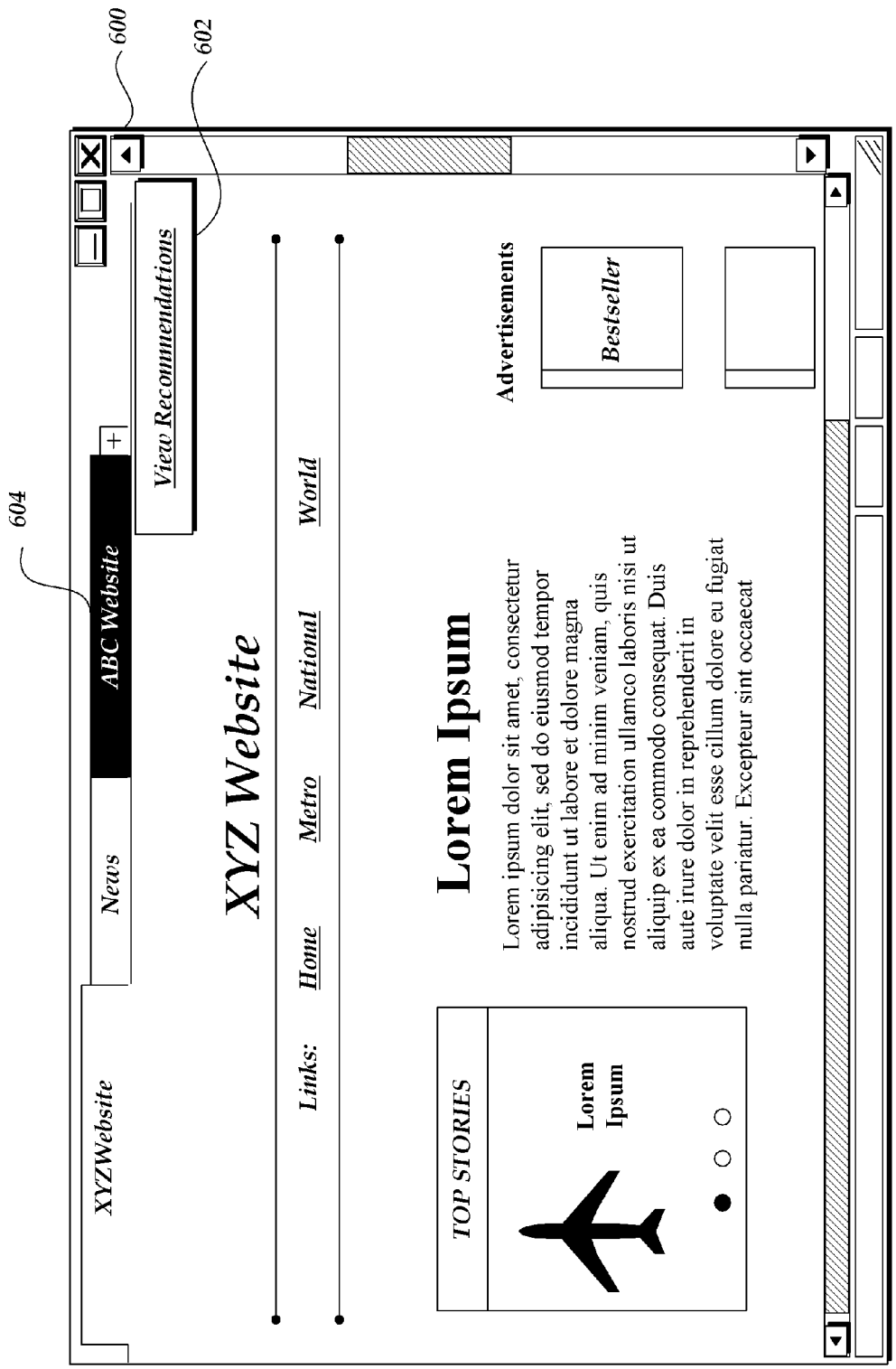
FIG. 6A is a user interface diagram depicting an illustrative browser interface displaying a requested resource.

FIG. 6A is a user interface diagram depicting an illustrative browser interface 600 and display of a content page. A user may interact with the content page displayed in the browser interface 600, for example by using a keyboard, mouse, or performing touch screen gestures to the display of the client device 102. As described herein, data regarding the user interactions may then be transmitted to the intermediary system 104 for use in determining the popularity of the content page.

Figure 6B:
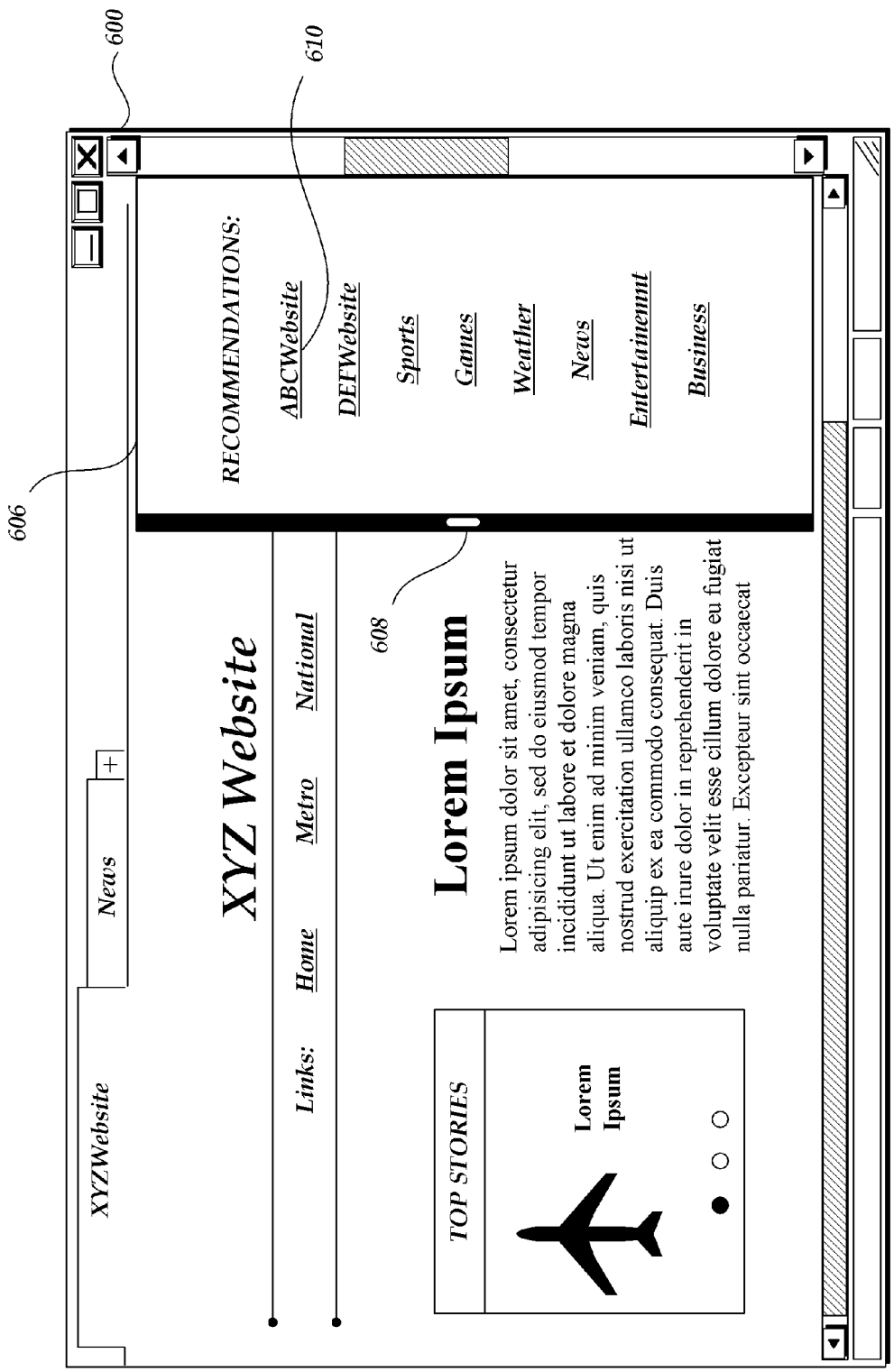
FIG. 6B is a user interface diagram depicting the browser interface of FIG. 6A displaying recommendations.

In response to receiving a list of one or more recommended content pages, the browser interface 600 can display a recommendation control 602 that will allow a user to access the recommendations. For example, when a user activates the recommendation control 602, such as by clicking, tapping, or entering a keyboard command, the browser interface 600 can display a recommendation pane 606, as shown in FIG. 6B. The recommendation pane 606 can contain a list of one or more links 610 to recommended web sites or individual content pages. When a user activates a link 610, the recommended web site or individual content page corresponding to the link 610 can be requested from the intermediary system 104, similar to when a user activates a link on content page or enters a URL. Alternatively, a user may cause display of the recommendation pane 606 by dragging a handle 608 to open the recommendation pane 606, rather than by activating a recommendation control 602. For example, the handle 608 may be visible on the side of the browser interface 600 even when the recommendation pane 606 is not visible. The handle 608 can flash or otherwise change appearance when a recommendation or list of recommendations has been received. In some embodiments, the handle 608 can be hidden until recommendations are received from the intermediary system 104.

In some embodiments, a top recommendation can automatically be opened in a background tab 604 of the browser interface 600, as illustrated in FIG. 6A, and the corresponding content page can be downloaded to the client device 102 and rendered for display in the background tab 604. The background tab 604 can flash or otherwise change appearance in order to call the user's attention to the recommendation. As with other browser tabs, the recommended page corresponding to the background tab 604 can be displayed in the browser interface 600 in response to user activation of the background tab 604. In some cases a user may not be interested in recommendations, so after passage of a period of time the background tab 604 can be automatically closed. In some embodiments, the automatic opening of a background tab 604 can be configured by the user. For example, the feature can be disabled or temporarily deactivated. The appearance and behavior of the background tab 604 can also be customized, for example the flashing feature can be disabled, or the time period before automatic closure of a background tab 604 can be configured.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for recommending content, the system comprising:
   a server comprising hardware configured to execute specific instructions, the server operable to:
      receive, from a client device having a plurality of device characteristics, a request for a content page;
      obtain historical request data associated with a plurality of requests for content pages from client devices, the client devices each having at least one device characteristic that is similar to at least one device characteristic of the client device, wherein the historical request data describes, at least, one or more performance metrics associated with content pages being presented on client devices that have particular device characteristics;

determine a recommendation of a content page related to the requested content page based, at least in part, on the historical request data and one or more of the plurality of device characteristics of the client device, wherein determining the recommendation comprises:

calculating a popularity level for one or more content pages associated with the historical request data; and selecting a content page based at least in part on the one or more popularity levels; and transmit data regarding the recommendation to the client device.

2. The system of claim 1, wherein the one or more performance metrics associated with a content page being presented on a particular client device include measurements associated with a satisfactory user experience of the content page being presented on the particular client device.

3. The system of claim 1, wherein a device characteristic comprises one of the following: central processor unit (CPU) speed; available memory; network latency; network bandwidth; display size; display resolution; input type; or installed codecs.

4. The system of claim 1, wherein the server obtains historical request data and determines a second recommendation of a content page prior to receiving a second request from a second client device.

5. A computer-implemented method for recommending content, the computer-implemented method comprising:

receiving, from a client device having one or more device characteristics:
  a request for a network resource; and
  data regarding the one or more device characteristics;

determining, by a server comprising computing hardware, a recommendation of a network resource related to the requested network resource based, at least in part, on historical request data describing one or more performance metrics associated with network resources being presented on client devices that each have at least one device characteristic that is similar to at least one device characteristic of the client device, wherein determining the recommendation comprises:

calculating a popularity level for one or more network resources associated with the historical request data; and selecting a network resource based at least in part on the one or more popularity; and transmitting, by the server, data regarding the recommendation to the client device.

6. The computer-implemented method of claim 5, wherein the requested network resource and the recommended resource comprise content pages.

7. The computer-implemented method of claim 5, wherein the device characteristics comprise technical features or functional capabilities of the client device.

8. The computer-implemented method of claim 7, wherein the device characteristics comprise at least one of the following: central processor unit (CPU) speed; available memory; network latency; network bandwidth; display size; display resolution; input type; or installed codecs.

9. The computer-implemented method of claim 7, wherein the determination is further based at least in part on a geolocation of the client device.

10. The computer-implemented method of claim 5, wherein calculating the popularity level for one or more network resources is performed prior to receiving the request from the client device.

11. The computer-implemented method of claim 5, wherein determining the recommendation is further based at least in part on the one or more popularity levels.

12. The computer-implemented method of claim 5, wherein the performance metrics associated with a network resource being presented on a particular client device includes measurements associated with a satisfactory user experience of the network resource being presented on the particular client device.

13. The computer-implemented method of claim 5, wherein the server is configured to host an instance of a browsing application in communication with a browsing application of the client device, the computer-implemented method further comprising:

processing, by the browsing application of the server, the requested network resource; and transmitting, by the server, an initial processing result to the client device, wherein the initial processing result comprises the processed network resource.

14. The computer-implemented method of claim 5, wherein the server is configured to host an instance of a browsing application in communication with a browsing application of the client device, the computer-implemented method further comprising:

processing, by the browsing application of the server, the recommended network resource; and in response to receiving, from the client device, a request for the recommended resource, transmitting an initial processing result to the client device.

15. Non-transitory physical computer storage comprising a software browsing application configured to execute a process comprising:

displaying, to a user of a client device, a network resource;

obtaining device characteristic data, wherein the device characteristic data comprises data regarding one or more technical features or functional capabilities of the client device;

transmitting the device characteristic data to a server; and receiving, from the server, data regarding one or more recommended network resources related to the displayed network resource, wherein the one or more recommended network resources are recommended, by the server, based at least in part on data describing performance metrics associated with network resources being presented on client devices that each have at least one device characteristic that is similar to at least one device characteristic of the client device, the recommendation being further based, at least in part, on calculated popularity levels for one or more of the network resources having the at least one device characteristic.

16. The non-transitory physical computer storage of claim 15, wherein the displayed network resource and the one or more recommended network resources comprise content pages.

17. The non-transitory physical computer storage of claim 15, wherein the technical features and functional capabilities comprise: central processor unit (CPU) speed; available memory; network latency; network bandwidth; display size; display resolution; input type; or installed codecs.

18. The non-transitory physical computer storage of claim 15, wherein the process further comprises transmitting geo-location data to the server.

19. The non-transitory physical computer storage of claim 15, wherein the data regarding the one or more recommended network resources comprises a link or network address for each recommended network resource.

20. The non-transitory physical computer storage of claim 15, wherein the process further comprises displaying an interactive control in response to receiving data regarding one or more recommended resources.

21. The non-transitory physical computer storage of claim 20, wherein the process further comprises displaying a link to at least one recommended network resource in response to a user activating the interactive control.

22. The system of claim 1, wherein the recommended content page is more suitable for presentation on the client device than the requested content page.

* * * * *